United States Patent
Kono et al.

(10) Patent No.: US 9,734,677 B2
(45) Date of Patent: Aug. 15, 2017

(54) TACTILE SENSATION PROVIDING DEVICE

(71) Applicant: KYOCERA CORPORATION, Kyoto (JP)

(72) Inventors: Kenji Kono, Yokohama (JP); Makoto Kawasaki, Okazaki (JP)

(73) Assignee: KYOCERA Corporation, Kyoto (JP)

(*) Notice: Subject to any disclaimer, the term of this patent is extended or adjusted under 35 U.S.C. 154(b) by 174 days.

(21) Appl. No.: 14/409,969

(22) PCT Filed: May 30, 2013

(86) PCT No.: PCT/JP2013/003425
§ 371 (c)(1),
(2) Date: Dec. 19, 2014

(87) PCT Pub. No.: WO2013/190780
PCT Pub. Date: Dec. 27, 2013

(65) Prior Publication Data
US 2015/0187189 A1 Jul. 2, 2015

(30) Foreign Application Priority Data

Jun. 22, 2012 (JP) ................. 2012-141446

(51) Int. Cl.
| H04B 3/36 | (2006.01) |
| G08B 6/00 | (2006.01) |
| G06F 3/041 | (2006.01) |
| G06F 3/01 | (2006.01) |

(52) U.S. Cl.
CPC .............. *G08B 6/00* (2013.01); *G06F 3/016* (2013.01); *G06F 3/041* (2013.01)

(58) Field of Classification Search
None
See application file for complete search history.

(56) References Cited

U.S. PATENT DOCUMENTS

| 4,037,221 A * | 7/1977 | Alexander | E05B 17/22 307/116 |
| 6,176,477 B1 * | 1/2001 | Takeo | F16F 13/105 267/140.11 |
| 7,355,595 B2 * | 4/2008 | Bathiche | G06F 3/016 340/4.12 |

(Continued)

FOREIGN PATENT DOCUMENTS

| JP | 05-320255 A | 12/1993 |
| JP | 2007-281786 A | 10/2007 |

(Continued)

OTHER PUBLICATIONS

International Search Report; PCT/JP2013/003425; Aug. 13, 2013.
Written Opinion of the International Search Report; PCT/JP2013/003425; Aug. 13, 2013; with concise explanantion.

*Primary Examiner* — Curtis King
(74) *Attorney, Agent, or Firm* — Studebaker & Brackett PC

(57) ABSTRACT

There is provided a tactile sensation providing device having a tactile sensation provider (20, 21, 22) configured to provide a tactile sensation by vibration and an atmospheric pressure controller 11 configured to control the atmospheric pressure of the space 50 opposite to the tactile sensation providing face 20a of the tactile sensation provider, when the tactile sensation provider vibrates.

8 Claims, 9 Drawing Sheets

(56) References Cited

U.S. PATENT DOCUMENTS

| | | | |
|---|---|---|---|
| 7,755,607 B2 * | 7/2010 | Poupyrev | G06F 1/1626 345/156 |
| 8,248,218 B2 * | 8/2012 | Yamaya | G06F 3/03545 340/4.12 |
| 2002/0149561 A1 * | 10/2002 | Fukumoto | G01C 21/3664 345/156 |
| 2006/0125162 A1 * | 6/2006 | Tashiro | F16F 13/264 267/140.14 |
| 2006/0202399 A1 * | 9/2006 | Maeno | F16F 13/105 267/140.14 |
| 2008/0119768 A1 * | 5/2008 | Kobayashi | B06B 1/045 601/78 |
| 2008/0221789 A1 * | 9/2008 | Oono | G01C 21/26 701/532 |
| 2009/0079706 A1 | 3/2009 | Mishima et al. | |
| 2010/0192110 A1 * | 7/2010 | Carter | G06F 3/011 715/865 |
| 2010/0292706 A1 * | 11/2010 | Dutson | G06F 3/016 606/130 |
| 2011/0032091 A1 * | 2/2011 | Park | G06F 3/016 340/407.2 |
| 2011/0148608 A1 * | 6/2011 | Grant | G06F 1/1626 340/407.2 |
| 2011/0210942 A1 | 9/2011 | Kitamori et al. | |
| 2011/0260843 A1 * | 10/2011 | Woo | G06F 3/016 340/407.2 |
| 2011/0260991 A1 | 10/2011 | Aono | |
| 2011/0260995 A1 * | 10/2011 | Woo | G06F 3/016 345/173 |
| 2012/0068834 A1 * | 3/2012 | Lee | G06F 3/0346 340/407.1 |
| 2013/0002608 A1 | 1/2013 | Autran | |
| 2013/0154988 A1 | 6/2013 | Inoue et al. | |
| 2013/0211418 A1 * | 8/2013 | Lim | B06B 1/06 606/130 |
| 2013/0325385 A1 * | 12/2013 | Shin | G01C 5/06 702/94 |
| 2014/0308940 A1 * | 10/2014 | Kwon | H04W 48/02 455/418 |
| 2015/0199011 A1 * | 7/2015 | Fukumoto | G06F 3/0488 345/173 |

FOREIGN PATENT DOCUMENTS

| | | |
|---|---|---|
| JP | 2009-080289 A | 4/2009 |
| JP | 2010-278616 A | 12/2010 |
| JP | 2011-034150 A | 2/2011 |
| JP | 2012-032980 A | 2/2012 |
| JP | 2012-048584 A | 3/2012 |
| WO | 2011/124784 A1 | 10/2011 |

* cited by examiner

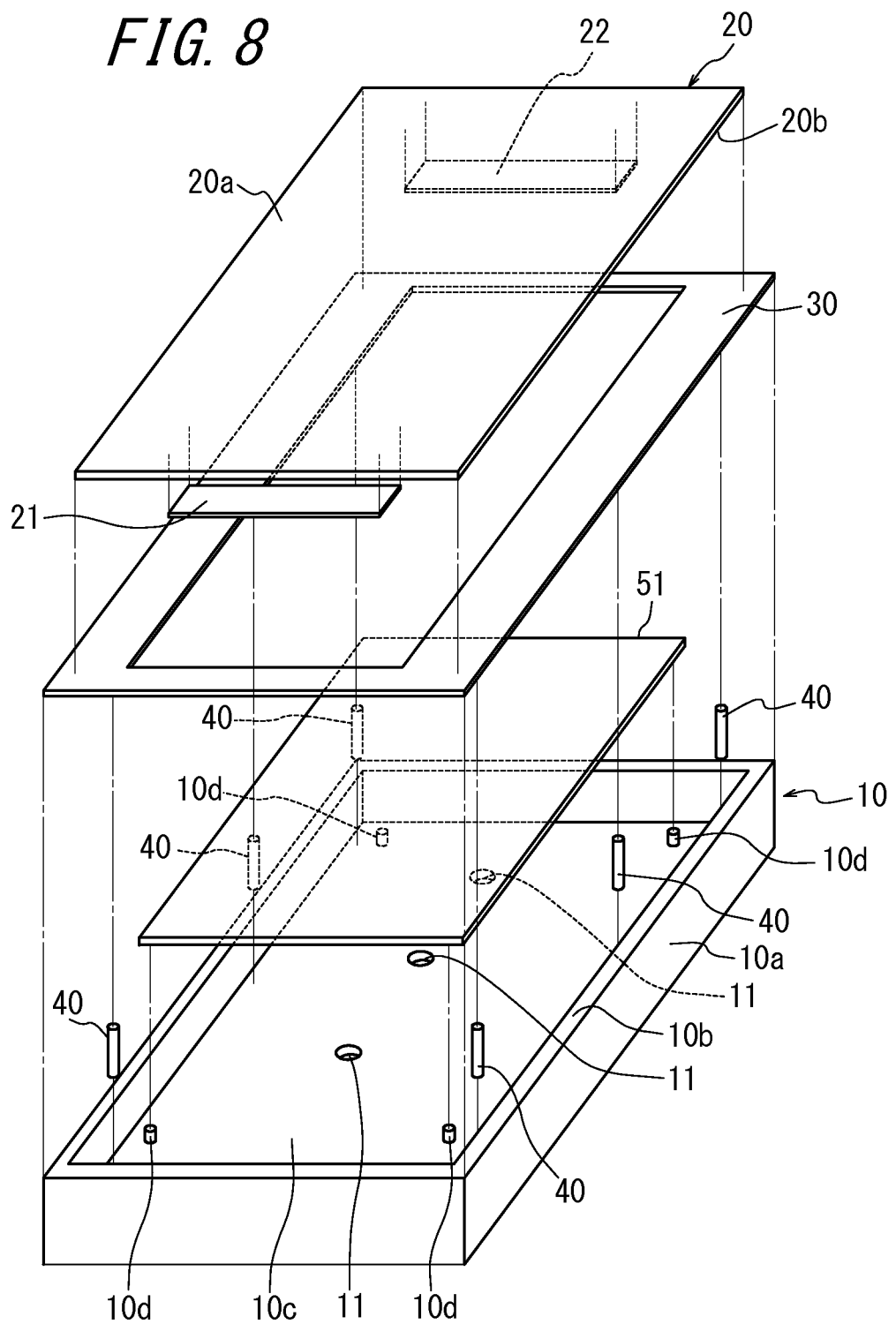

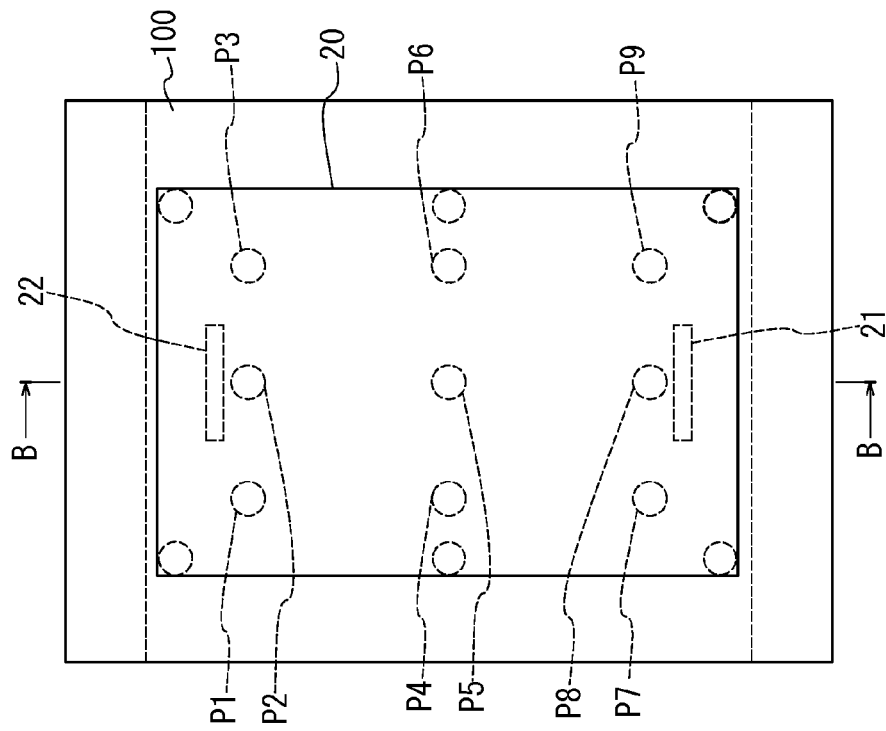
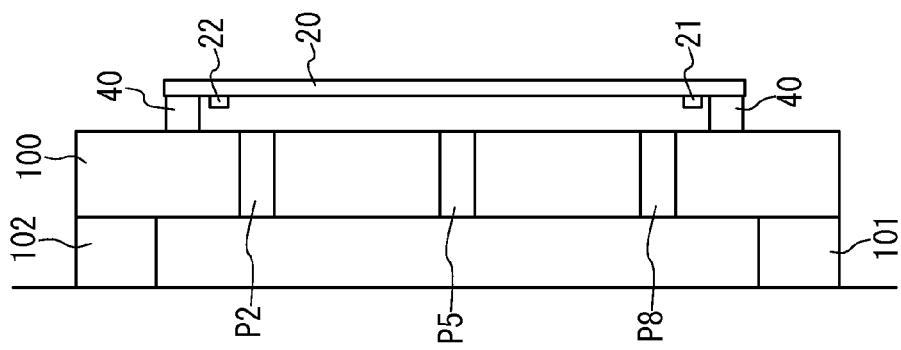

TACTILE SENSATION PROVIDING DEVICE

CROSS-REFERENCE TO RELATED APPLICATION

This application claims priority to and the benefit of Japanese Patent Application No. 2012-141446 filed on Jun. 22, 2012, the entire contents of which are incorporated herein by reference.

TECHNICAL FIELD

The present invention relates to a tactile sensation providing device that provides a tactile sensation by vibration.

BACKGROUND

In recent years, a tactile sensation providing device that provides a tactile sensation to the operation by the operator is increasingly mounted on the portable information equipment such as smartphones or tablet PCs, various consumer equipment such as household appliances like microwaves, TV sets or lighting appliances, and various industrial devices (factory automation equipment) such as ATMs (Automated Teller Machines), automatic ticket vending machines, automatic vending machines, or the like (see, for example, Patent Literature 1).

CITATION LIST

Patent Literature 1: JP2011034150A

SUMMARY

Technical Problem

It is desired for the above-described tactile sensation providing device to vibrate efficiently a tactile sensation provider that provides a tactile sensation by vibration, in light of low power consumption, for example.

The present invention has thus been conceived in light of the above circumstances and aims to provide a tactile sensation providing device capable of vibrating a tactile sensation provider efficiently.

Solution to Problem

The invention of the tactile sensation providing device that achieves the above described object has:
  a tactile sensation provider configured to provide a tactile sensation by vibration; and
  an atmospheric pressure controller configured to control the atmospheric pressure of a space opposite to a tactile sensation providing face of the tactile sensation provider, when the tactile sensation provider vibrates.

The atmospheric pressure controller may have an atmospheric pressure control member.

The atmospheric pressure controller may have a vent for controlling the atmospheric pressure.

The atmospheric pressure control member may be a porous filter.

The porous filter may be a filter that has an air permeability and a dustproof function or a waterproof function as well.

The atmospheric pressure control member may further have a filter for sealing the vent, and the filter may have an air permeability and a dustproof function or a waterproof function as well.

The atmospheric pressure control member may further have an opening/closing unit that allows the vent to be opened/closed.

The atmospheric pressure controller may reduce the change in atmospheric pressure.

The atmospheric pressure controller may increase the change in atmospheric pressure.

According to the present invention, a tactile sensation providing device that can vibrate a tactile sensation provider efficiently can be provided.

BRIEF DESCRIPTION OF DRAWINGS

FIG. 8 is an exploded perspective view illustrating a schematic configuration of a main part of a tactile sensation providing device according to a fifth embodiment; and FIGS. 9A and 9B are diagrams illustrating respectively a schematic configuration of an experimental device that measures a relation between the vibration amplitude of the panel in FIG. 8 and the number and the location of vents formed in a housing.

DESCRIPTION OF EMBODIMENTS

Embodiments of the present invention will be described below with reference to the drawings.

(First Embodiment)

Figure 1:
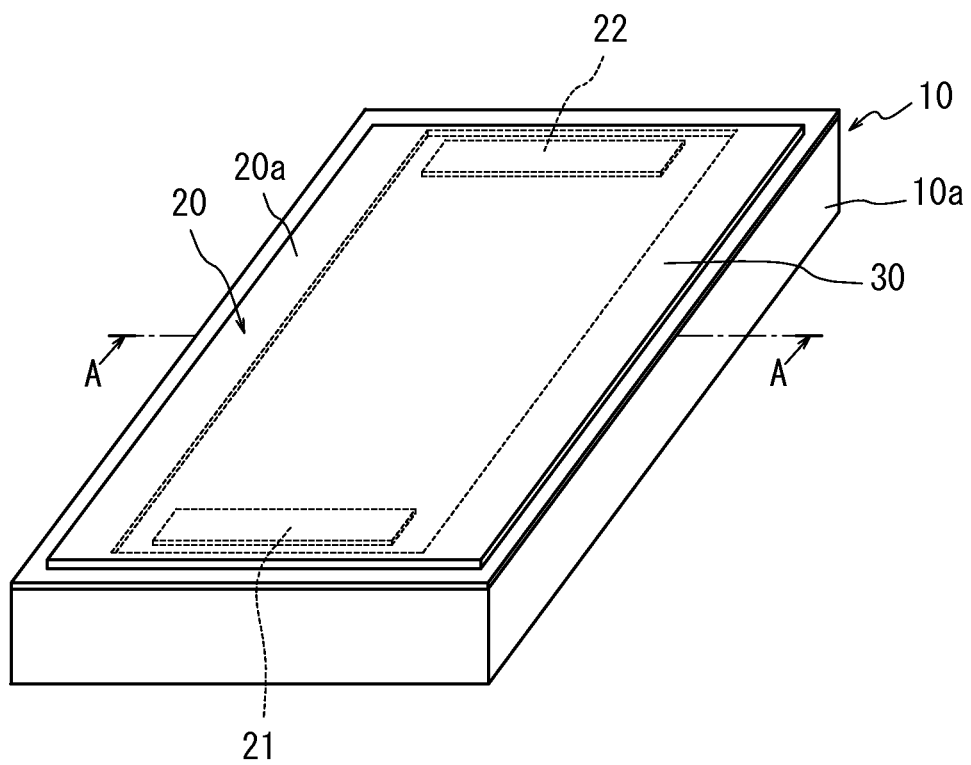
FIG. 1 is an external perspective view illustrating a schematic configuration of a main part of a tactile sensation providing device according to a first embodiment.
Figure 2:
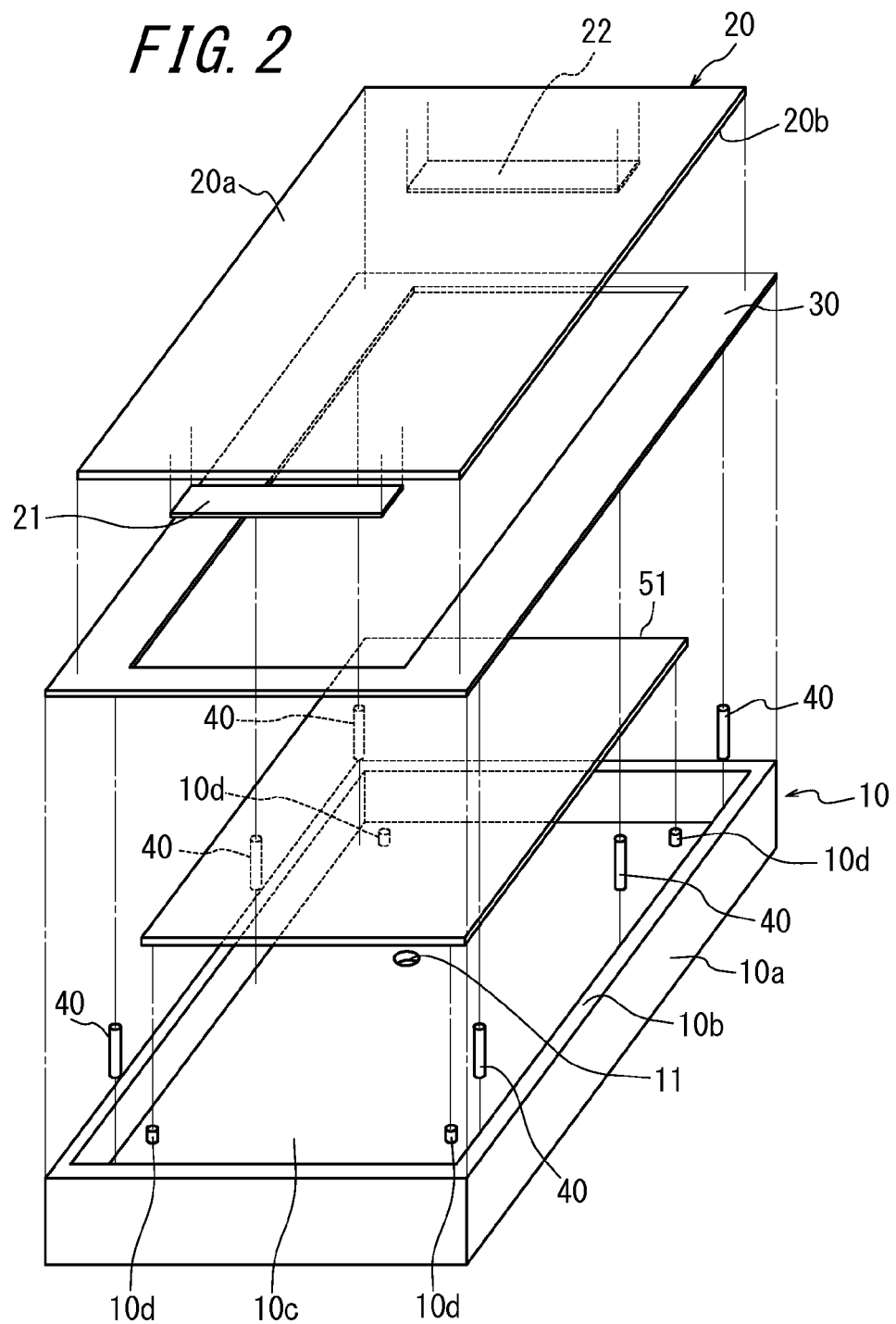
FIG. 2 is an exploded perspective view of FIG. 1.
Figure 3:
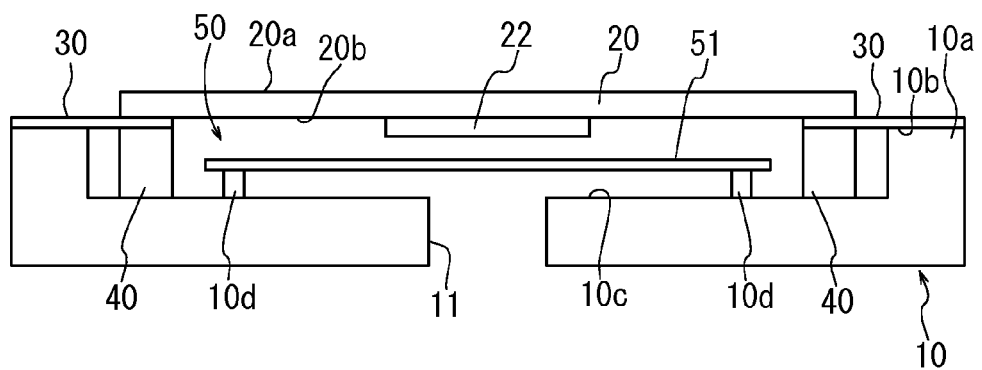
FIG. 3 is an enlarged cross-sectional view along line A-A in FIG. 1.

FIGS. 1 to 3 are diagrams illustrating respectively a main part of a tactile sensation providing device according to a first embodiment of the present invention. FIG. 1 is an external perspective view, FIG. 2 is an exploded perspective view and FIG. 3 is an enlarged cross-sectional view along the line A-A in FIG. 1. The tactile sensation providing device according to the present embodiment has a housing 10, a panel 20 and a shielding member 30 in appearance.

The housing 10 is made of, for example, metal or plastic, and is formed in a rectangular shape in plan view. Note that, in this specification, a rectangular shape includes a shape with corners formed in an arc shape. In addition, in the illustrated examples, the housing 10 is illustrated as one housing, however, the housing 10 may be configured by combining an upper housing and a lower housing. In this case, a space between the upper housing and the lower housing is provided with appropriate dustproof or waterproof measures by adopting a sealing structure using a rubber packing, for example.

The panel 20 is operated by an operator's finger or a stylus pen, and is formed by, for example, plastic, glass, or the like, with a thickness that allows minimal warping displacement (e.g. tens of μm). Note that the panel 20 may be formed by a touch panel having a publicly known contact detecting function such as, for example, a resistive film type, a capacitive type, and an optical type. Furthermore, in the illustrated example, although the panel 20 is in a rectangular shape in plan view, it may be in a square shape.

For the panel 20, on the panel back 20b which is on the opposite side of the tactile sensation providing face (operation face) 20a, two piezoelectric elements 21 and 22 are provided to cause the panel 20 to warp and vibrate. The piezoelectric elements 21 and 22 are formed in a long rectangular shape of the same structure, such as a monomorph, a bimorph, a unimorph, or the like, and warp or expand/contract in a longitudinal direction when voltage is applied thereto. One of the piezoelectric elements, which is the piezoelectric element 21, is adhered and fixed to the panel back 20b such that, on one of short sides opposed to each other on the panel back 20b, the longitudinal direction thereof extends along the short side. In the same manner, the other piezoelectric element 22 is adhered and fixed to the panel back 20b such that, on the other side of the short sides on the panel back 20b, the longitudinal direction thereof extends along the short side. The panel 20 and the piezoelectric elements 21 and 22 form a tactile sensation provider.

The shielding member 30 is a sheet-like member provided with, for example, a dustproof function or a waterproof function, and is formed in a frame shape. For the shielding member 30, the inner periphery thereof is adhered to the periphery of the panel back 20b of the panel 20 with double-sided tape or adhesive, or the like, and the outer periphery thereof is adhered to the upper surface 10b of the outer periphery 10a of the housing 10 with double-sided tape or adhesive. In addition, at six locations in total corresponding to the four corners of the panel 20 and the center of each long side of the panel 20, elastically deformable support members 40 are disposed respectively by being adhered with double-sided tape or adhesive between the back of the inner periphery side of the shielding member 30 and the bottom 10c of the housing 10.

As the support member 40, "PORON" (trademark) or the like can be used. Thus, the panel 20 is supported to the bottom 10c of the housing 10 by six support members 40. Therefore, in the illustrated example, with six support members 40, a space (gap) 50 is formed, in the housing 10, between respective back sides of the panel 20 and the shielding member 30 and the bottom 10c of the housing 10. Note that, for the panel 20, the shielding member 30 may be adhered to the periphery of the tactile sensation providing face 20a, and the support member 40 may be adhered to the panel back 20b. Furthermore, a cylindrical support member 40 is illustrated, however, it may be any shape such as a prism shape.

In the space 50, a circuit board 51 on which a drive circuit or the like for the piezoelectric elements 21 and 22 is mounted is supported by the hosing 10 and disposed thereon, separated from the bottom 10c of the housing 10 through the support unit 10d that is integrated into or separated from the housing 10. Note that, in the space 50, as necessary, a display panel such as a liquid crystal panel or the like may be mounted on the panel integrally therein or separately therefrom, or if the tactile sensation providing device is a portable type, a battery may be mounted therein.

The vent 11 that allows the space 50 to communicate with outside air is formed on the bottom 10c of the housing 10. The vent 11 forms an atmospheric pressure controller that controls the atmospheric pressure of the space 50, and any number of vents 11 can be formed at any locations including not only the bottom 10c but also the outer periphery 10a, if only it communicates with the space 50. In addition, the opening area of the vent 11 is set appropriately depending on the volume of the space 50, change in the atmospheric pressure in the space 50 due to vibration of the panel 20, the location where the vent 11 is formed or the number thereof, or the like. In the present embodiment, one vent 11 is formed at the location corresponding to the center of the panel 20, in the region of the bottom 10c opposed to the panel 20. Note that, in FIG. 3, the vent 11 is illustrated in an exaggerated manner.

The tactile sensation providing device according to the present embodiment detects an operation to the panel 20 and drives the piezoelectric elements 21 and 22. Thus, the panel 20 is warped and vibrated in a direction of a double-headed arrow illustrated in FIG. 4, then a tactile sensation is provided to the operator of the panel 20. Note that, in FIG. 4, the panel 20 warps and the tactile sensation providing face 20a protrudes upward. Here, the operation to the panel 20 may be detected by a contact detecting function, if the panel 20 has the function. Furthermore, the contact to the panel 20 may be detected by detecting a press by contact to the panel 20. In this case, a press to the panel 20 may be detected by using the piezoelectric elements 21 and 22, or by providing a piezoelectric element for detecting a press or a strain sensor separately.

Figure 4:
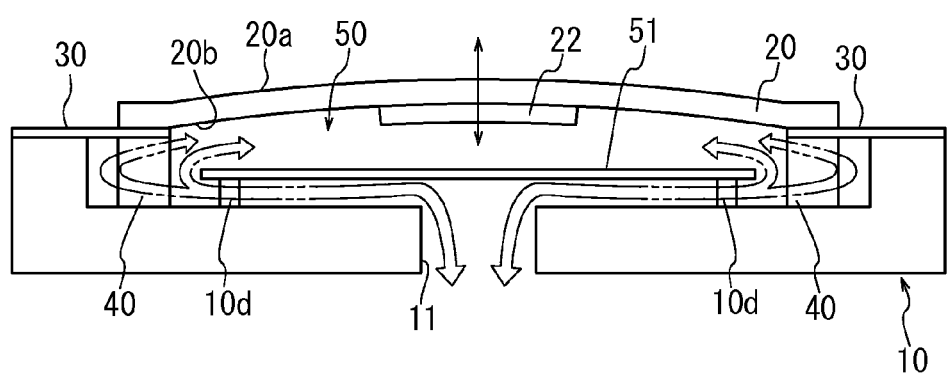
FIG. 4 is a diagram for explaining an operation of the tactile sensation providing device illustrated in FIG. 1.

According to the present embodiment, when the panel 20 vibrates, in response to the change in the volume of the space 50 due to vibration, air is circulated between the space 50 and the outside air through the vent 11 as indicated by the double-headed arrow. That is, when a part of the panel 20 protrudes upward as illustrated in FIG. 4 and the volume of the space 50 increases, associating with the increase, the outside air flows from the vent 11 into the space on the side of the panel back 20b, passing around the bottom and the side of the circuit board 51. Furthermore, when a part of the panel 20 displaces downward from the state illustrated in FIG. 4 and the volume of the space 50 decreases, associating with the decrease, the air in the space on the side of the panel back 20b flows out to the outside through the vent 11, passing around the side and the bottom of the circuit board 51. Thus, change in the atmospheric pressure in the space 50 based on vibration of the panel 20 is reduced, and the panel 20 can be vibrated efficiently by the piezoelectric elements 21 and 22.

Note that, in FIG. 4, if the vent 11 is not formed and the space 50 is sealed, when the piezoelectric elements 21 and 22 are driven to vibrate the panel 20, the air in the space 50 is expanded/compressed in response to the vibration. Thus, when the panel 20 is vibrated with a desired amplitude, compared with this embodiment, a larger driving power is required to be supplied to the piezoelectric elements 21 and 22, thus resulting in an increase in power consumption.

(Second Embodiment)

Figure 5:
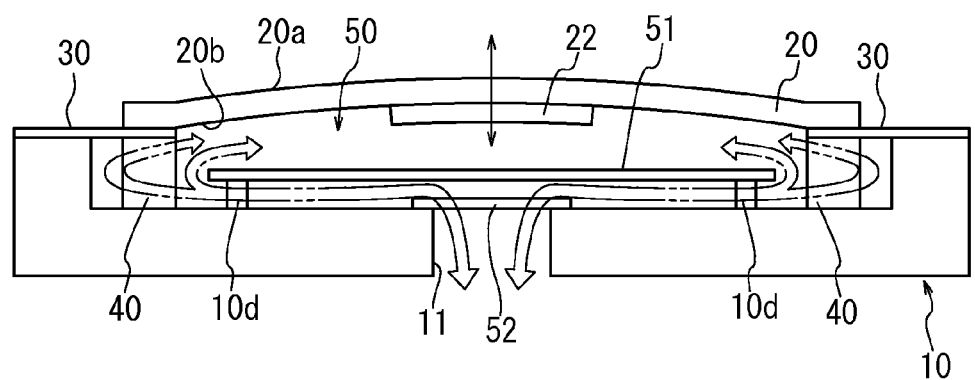
FIG. 5 is an enlarged cross-sectional view illustrating a schematic configuration of a main part of a tactile sensation providing device according to a second embodiment.

FIG. 5 is an enlarged cross-sectional view of a main part of a tactile sensation providing device according to a second embodiment of the present invention. The tactile sensation providing device according to the present embodiment is provided with a filter 52 to seal the vent 11 in the structure according to the first embodiment. That is, in the present embodiment, the atmospheric pressure controller has the vent 11 and the filter 52. Other than that, it has the same structure as that according to the first embodiment. Thus the same reference sign is given to the component that is the same as the first embodiment and the explanation thereof is omitted. Note that, as with FIG. 4, FIG. 5 illustrates a state where the panel 20 warps and the tactile sensation providing face 20a protrudes upward.

The filter 52 is configured such that it has an air permeability and a dustproof function or a waterproof function as well, and is attached to the bottom 10c of the housing 10 such that it seals the vent 11 with double-sided tape or adhesive. As the filter 52 having such functions, for example, porous sponges, Gore-Tex (trademark), or the like, can be used. Furthermore, the filter 52 may be configured to have an air permeability and a dustproof function or a waterproof function as well by forming a plurality of pores in a sheet member. Note that FIG. 5 illustrates an example where the filter 52 is attached to inside the housing of the bottom 10c, however, the filter 52 may be attached to outside the housing or both inside and outside of the housing.

According to the tactile sensation providing device of the present embodiment, the same effect as that of the first embodiment can be obtained, and in addition, since the vent 11 is provided with dustproof or waterproof measures by the filter 52, the shielding member 30 has a dustproof function or a waterproof function, and thus the whole device is provided with a dustproof function or a waterproof function.

(Third Embodiment)

Figure 6:
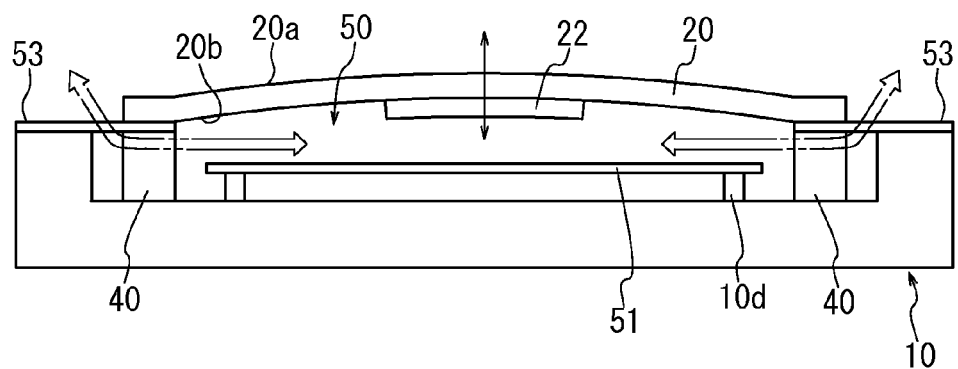
FIG. 6 is an enlarged cross-sectional view illustrating a schematic configuration of a main part of a tactile sensation providing device according to a third embodiment.

FIG. 6 is an enlarged cross-sectional view of a main part of a tactile sensation providing device according to a third embodiment of the present invention. According to the tactile sensation providing device of the present embodiment, in the structure of the first embodiment, the vent 11 is not formed on the bottom 10c of the housing 10, and the shielding member 30 is formed by the porous filter 53 as an atmospheric pressure control member. Other than that, it has the same structure as that of the first embodiment. Thus the same reference sign is given to the component that is the same as the first embodiment and the explanation thereof is omitted.

The porous filter 53 has, for example, an air permeability and a dustproof function or a waterproof function as well, and may have the same structure as the filter 52 in FIG. 5, for example. Note that the porous filter 53 can be a whole or a part of the shielding member 30 in FIG. 1.

According to the present embodiment, when the panel 20 vibrates, in response to the change in volume of the space 50 due to vibration, the air is circulated through the porous filter 53 as indicated by a double-headed arrow. Note that, FIG. 6 illustrates, as with FIG. 4, a state where the panel 20 warps and the tactile sensation providing face 20a protrudes upward. Therefore, the same effect as that of the first embodiment can be obtained. Furthermore, for the tactile sensation providing device according to the present embodiment, it is not required to form a vent for controlling the atmospheric pressure in the housing 10, and the porous filter 53, which is an atmospheric pressure control member, serves as the shielding member 30 in FIG. 1. Thus a dustproof effect or a waterproof effect can be obtained with a simple structure, and cost down can be expected.

(Fourth Embodiment)

Figure 7:
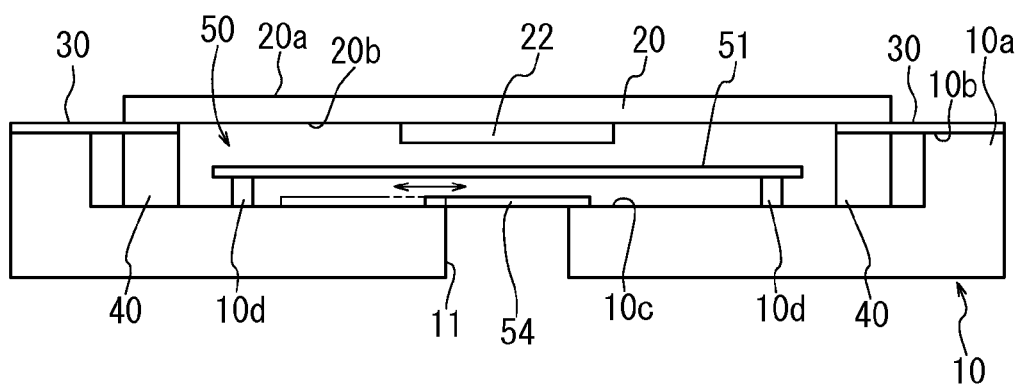
FIG. 7 is an enlarged cross-sectional view illustrating a schematic configuration of a main part of a tactile sensation providing device according to a fourth embodiment.

FIG. 7 is an enlarged cross-sectional view of a main part of a tactile sensation providing device according to a fourth embodiment of the present invention. According to the tactile sensation providing device of the present embodiment, in the first embodiment, an opening/closing unit 54 that allows the vent 11 to be opened/closed is provided. That is, in the present embodiment, the atmospheric pressure controller has the vent 11 and the opening/closing unit 54. Other than that, it has the same structure as that of the first embodiment. Thus the same reference sign is given to the component that is the same as the first embodiment and the explanation thereof is omitted.

The opening/closing unit 54 has, for example, an on-off valve such as a slidable shutter value, and can be configured such that drive of the on-off valve is controlled such that the vent 11 is normally closed by the on-off valve and is opened, during vibration of the panel 20, in synchronization with the drive of the piezoelectric elements 21 and 22, that is, in synchronization with the vibration of the panel 20. In addition, the opening/closing unit 54 may be configured such that the vent 11 can be opened/closed in response to the fluctuation of the atmospheric pressure inside the space 50 due to the vibration of the panel 20. Furthermore, when a plurality of vents 11 are provided, the opening/closing units 54 of some of the vents 11 are allowed to function as a one-way valve that opens corresponding vent 11 in response to decrease in the atmospheric pressure inside the space 50 due to vibration of the panel 20 to introduce the outside air. Then, the opening/closing units 54 of the other vents 11 may be configured to function as a one-way valve that opens a corresponding vent 11 in response to increase in the atmospheric pressure inside the space 50 due to vibration of the panel 20 to discharge the air inside the space 50 to the outside.

According to the tactile sensation providing device of the present embodiment, when the panel 20 vibrates, the vent 11 is opened by the opening/closing unit 54, thus the same effect as that of the first embodiment can be obtained. In addition, when the panel 20 does not vibrate, the vent 11 is closed by the opening/closing unit 54, thus a dustproof effect or a waterproof effect can be expected.

(Fifth Embodiment)

FIG. 8 is an exploded perspective view illustrating a schematic configuration of a main part of a tactile sensation providing device according to a fifth embodiment. According to the tactile sensation providing device of the present embodiment, in the configuration of the first embodiment, three vents 11 are formed on the bottom 10c of the housing 10 such that change in the atmospheric pressure in the space 50 increases when the panel 20 vibrates. That is, in the present embodiment, the atmospheric pressure controller is formed by three vents 11. Other than that, it has the same configuration as that of the first embodiment, and thus the same reference sign is given to the component that is the same as the first embodiment and the explanation thereof is omitted.

Here, an example where the atmospheric pressure in the space 50 increases when the panel 20 vibrates is explained.

The inventors of the present invention performed various experiments of the panel 20 to which the piezoelectric elements 21 and 22 explained in the above-described embodiments are attached, with respect to the relationship between the vibration amplitude of the panel 20 when the piezoelectric elements 21 and 22 are driven under the same condition and the number and the location of the vent 11 formed on the housing 10. FIG. 9 illustrates an example of the experiment device. FIG. 9A is a plan view and FIG. 9B is a cross-sectional view along line B-B in FIG. 9A.

The experiment device in FIG. 9 has a rectangular substrate 100, which is larger than the panel 20 in plan view. The panel 20 to which the piezoelectric elements 21 and 22 are attached is supported at six points on the substrate 100 through six support members 40. On the substrate 100, in the region opposed to the panel 20, three vents 11, each having the same diameter as one another, are formed side by side in the short side direction, on one end, the central part and the other end in the long side direction of the panel 20. Thus, nine vents 11 are formed in total. Here, nine vents 11 are represented by P1 to P9 for convenience sake. In addition, the support members 101 and 102 are attached to the back on the short side of the substrate 100. Note that the side between the panel 20 and the substrate 100 is opened.

The inventors of the present invention appropriately seal nine vents P1 to P9 of the experiment device in FIG. 9 with the sealing member having no air permeability, and drive the piezoelectric elements 21 and 22 at the same voltage and a predetermined frequency range to measure the maximum value of vibration amplitude of the panel 20. The table below shows the results of the experiment of this case. Note that, in the table below, the measuring point M1 indicates a location on the surface of the panel 20 corresponding to the vent P1, the measuring point M2 indicates a location on the surface of the panel 20 corresponding to the vent P4, the measuring point M3 indicates a location on the surface of the panel 20 corresponding to the vent P2 and the measuring point M4 indicates a location on the surface of the panel 20 corresponding to the vent P5 . In addition, the measuring values at the measuring points M1 to M4 indicate respectively a maximum value, in the case where the panel 20 is vibrated with all of the vents P1 to P9 sealed, as a reference of "100."

TABLE 1

| Experiment | No. of openings | Location of opening | \multicolumn{4}{c}{Measuring point} |
|---|---|---|---|---|---|---|
| | | | M1 | M2 | M3 | M4 |
| 1 | 0 | | 100 | 100 | 100 | 100 |
| 2 | 9 | All openings are opened | 256 | 286 | 169 | 297 |
| 3 | 6 | P1 to P3/P7 to P9 | 265 | 300 | 160 | 290 |
| 4 | 3 | P1 to P3 | 198 | 220 | 135 | 216 |
| 5 | 3 | P2, P5, P8 | 292 | 330 | 160 | 285 |
| 6 | 2 | P2, P8 | 253 | 273 | 154 | 256 |
| 7 | 1 | P5 | 241 | 227 | 155 | 226 |

As obvious from the results of the above described experiments, when the vent 11 is formed, compared with the case where the vent 11 is not formed in Experiment 1, vibration amplitude is increased in all cases. In particular, in Experiments 3 and 5, at the measuring points M1 and M2, vibration amplitude is larger than the case where all openings are opened in Experiment 2. It is assumed that this phenomenon is caused as follows: due to a plurality of vents 11 formed on appropriate portions, change in the atmospheric pressure in the space between the panel 20 and the substrate 100, that is, in the space 50 in the above described embodiment, is increased when the panel 20 vibrates, and action of amplifying the vibration of the panel 20 works.

The tactile sensation providing device in FIG. 8 illustrates the case where, based on the above described experiment results, three vents 11 are formed, as with the Experiment 5, in the region of the bottom 10c opposed to the panel 20, side by side in the central portion of the short side of the panel 20 along the direction of the long side. Therefore, according to the present embodiment, the panel 20 can be vibrated more efficiently. It is assumed that, the location and the number of the vent 11 that increases change in the atmospheric pressure in the space 50 to amplify the vibration of the panel 20 when the panel 20 vibrates depends also on the shape or the like of the circuit board 51 or the like mounted in the space 50. Therefore, the locations where a plurality of vents 11 are respectively formed and the number thereof are set appropriately by experiments, simulations, or the like, based on the actual mounting structure of the tactile sensation providing device.

Note that the present invention is not limited to the above described embodiments, and a person skilled in the art can make various variations and modifications easily based on the present disclosure. Therefore, note that these variations and modifications are included in the scope of the present invention. For example, the atmospheric pressure controller may be configured by appropriately combining each atmospheric pressure controller described in the above described embodiments. Furthermore, the panel 20 is not limited to be vibrated by two piezoelectric elements 21 and 22, and may be configured to be vibrated by one or three or more piezoelectric elements. In addition, the panel 20 is not limited to warp vibration, and the surface thereof may be vibrated parallel to the normal line. Moreover, the source of vibration of the panel 20 is not limited to a piezoelectric element, and may be an eccentric motor or an actuator.

REFERENCE SIGNS LIST

10 Housing
10a Outer periphery
10b Upper face
10c Bottom
10d Support unit
11 Vent
20 Panel
20a Tactile sensation providing face
20b Panel back
21, 22 Piezoelectric element
30 Shielding member
40 Support member
50 Space
51 Circuit board
52 Filter
53 Porous filter
54 Opening/closing unit

The invention claimed is:

1. A tactile sensation providing device, comprising:
a tactile sensation provider configured to provide a tactile sensation by vibration; and
an atmospheric pressure controller configured to control an atmospheric pressure of a space in a housing opposite to a tactile sensation providing face of the tactile sensation provider when the tactile sensation provider vibrates,
wherein a volume of the space changes in response to the vibration of the tactile sensation provider,
wherein the atmospheric pressure controller comprises an atmospheric pressure control member,
wherein the tactile sensation provider and the atmospheric pressure controller are provided inside the housing, and
wherein the atmospheric pressure control member is provided on an inner face of a bottom side of the housing.

2. The tactile sensation providing device according to claim 1, wherein the atmospheric pressure control member further comprises a filter that seals the vent, and the filter has an air permeability and a dustproof function or a waterproof function as well.

3. The tactile sensation providing device according to claim 1, wherein the atmospheric pressure control member further comprises an opening/closing unit that allows the vent to be opened/closed.

4. The tactile sensation providing device according to claim 1, wherein the atmospheric pressure controller reduces change in the atmospheric pressure.

5. The tactile sensation providing device according to claim 1, wherein the atmospheric pressure controller increases change in the atmospheric pressure.

6. A tactile sensation providing device, comprising:
a tactile sensation provider configured to provide a tactile sensation by vibration; and
an atmospheric pressure controller configured to control an atmospheric pressure of a space in a housing opposite to a tactile sensation providing face of the tactile sensation provider when the tactile sensation provider vibrates,
wherein a volume of the space changes in response to the vibration of the tactile sensation provider,
wherein the atmospheric pressure controller comprises an atmospheric pressure control member,
wherein the atmospheric pressure controller comprises a vent for controlling the atmospheric pressure, and
wherein air flows in and out of the space through the vent, passing around a side and a bottom of a circuit board provided inside the space.

7. A tactile sensation providing device, comprising:
a tactile sensation provider configured to provide a tactile sensation by vibration; and
an atmospheric pressure controller configured to control an atmospheric pressure of a space in a housing opposite to a tactile sensation providing face of the tactile sensation provider when the tactile sensation provider vibrates,
wherein a volume of the space changes in response to the vibration of the tactile sensation provider,
wherein the atmospheric pressure controller comprises an atmospheric pressure control member,
wherein the atmospheric pressure control member is formed by a porous filter,
wherein the tactile sensation provider comprises a panel,
wherein the porous filter is provided between an upper face of the housing and a back of the panel, and
wherein the back faces the space.

8. The tactile sensation providing device according to claim 7, wherein the porous filter is formed by a filter having an air permeability and a dustproof function or a waterproof function as well.

* * * * *